United States Patent [19]

Webster

[11] 4,416,522

[45] Nov. 22, 1983

[54] DAYLIGHT PHOTOPLOTTING AND FILM THEREFOR

[75] Inventor: Ronald B. Webster, Ellington, Conn.

[73] Assignee: The Gerber Scientific Instrument Company, South Windsor, Conn.

[21] Appl. No.: 342,195

[22] Filed: Jan. 25, 1982

[51] Int. Cl.[3] .................................... G03B 41/00

[52] U.S. Cl. .................................... 354/4; 355/32; 430/338

[58] Field of Search .............. 354/4; 355/32; 430/338, 430/363, 506; 346/108; 250/316.1, 319, 327.2, 329

[56] References Cited

U.S. PATENT DOCUMENTS

| | | | |
|---|---|---|---|
| 2,509,766 | 5/1950 | Gross | 430/363 |
| 3,061,722 | 10/1962 | Mittelstaedt | 430/363 |
| 3,849,138 | 11/1974 | Wyckoff | 430/506 |
| 4,112,459 | 9/1978 | Gautier et al. | |
| 4,170,745 | 10/1979 | Rich et al. | 354/4 |
| 4,249,807 | 2/1981 | Webster et al. | 354/4 |
| 4,249,808 | 2/1981 | Webster | 354/4 |

*Primary Examiner*—A. A. Mathews

*Attorney, Agent, or Firm*—McCormick, Paulding & Huber

[57] ABSTRACT

A photosensitive film for plotting color images in daylight uses surface emulsion layers sensitive only to different and predetermined wavelengths of non-visible radiant energy. Each emulsion layer is developable to manifest a distinguishable color upon exposure to sensitizing radiant energy. Three sensitized emulsion layers can singly and collectively manifest any color upon development. During a plotting operation in daylight, a beam of radiant energy having a controlled composition of radiant energy wavelengths outside the visible spectrum is projected onto the film surface in the form of a spot. The beam of radiant energy and the film are moved relative to one another to cause the spot to sensitize the emulsion layers at different locations according to the desired plot. Changing the composition of the sensitizing wavelengths comprising the beam during a plotting operation causes the film to yield a multi-colored image upon development.

8 Claims, 4 Drawing Figures

DAYLIGHT PHOTOPLOTTING AND FILM THEREFOR

BACKGROUND OF THE INVENTION

This invention relates to a plotting apparatus, method and film for recording color images, and deals more particularly with a photoplotting apparatus, method and film utilizing non-visible radiant energy, that is, radiant energy outside the visible wavelength region of the radiant energy spectrum to plot in daylight conditions. Within the scope of the specification, daylight includes natural and artificial illumination at light levels rendering objects visible to the unaided eye.

A method for plotting graphic images in color on a photosensitive surface is described in U.S. Pat. No. 4,249,807 by Webster and Larson, and employs a photoplotting apparatus having an optical exposure head to project a beam of radiant energy having different or changeable color components onto the photosensitive surface of a film. Various emulsion layers defining the photosensitive surface record the color components of the projected beam. Drive motors within the apparatus, or photoplotter, move the spot of radiant energy generated by the beam over the film surface and expose the film in accordance with the color components of the beam.

Typically, color film used in photoplotting includes three emulsion layers for recording the color components of a projected beam. The color of any beam may be defined by various amounts of magenta, cyan, and yellow light, the subtractive primary colors, in the beam, and it is common for each of the three emulsion layers in the film to record a respective one of the three primary colors.

The plotting operation using conventional color film must be performed in a low light-level room to avoid exposure of the emulsion layers by the magneta, cyan and yellow color components of the visible light spectrum. An obvious disadvantage associated with plotting in a low light-level environment is that it is difficult for the operator to see. Additionally, special darkrooms must be provided for the plotting function, and control over ingress and egress to the room must be maintained to prevent inadvertent admission of outside light while a plotting operation is underway. The film must also receive special handling when the darkroom conditions do not prevail.

It is, therefore, a general object of this invention to provide a film for recording color images in a daylight or lighted environment and a method and apparatus for plotting on the film in this environment.

SUMMARY OF THE INVENTION

The present invention relates to a photoplotting method and apparatus and photosensitive film for recording colored images in a daylight or lighted environment.

The film of this invention includes sheet material having a plurality of emulsion layers in overlying relationship. Each of the emulsion layers is sensitive only to predetermined wavelengths of non-visible radiant energy and the wavelengths are different for each emulsion. The wavelengths, for example, may lie in the infrared or ultraviolet regions of the energy spectrum. Each emulsion upon exposure to sensitizing radiant energy is developable to manifest a distinguishable color different from the other emulsions. In one embodiment, there are three emulsion layers and the different and distinguishable colors manifested by the emulsion layers are the subtractive primary colors magneta, cyan and yellow.

The apparatus for plotting on the color film of this invention includes the color film as an integral component. The apparatus further includes a support surface on which the color film is spread, a radiant energy source for sensitizing at least one of the film emulsion layers, and means for projecting the radiant energy emitted from the source along a beam axis and onto a spot on the film surface. Support means support the source and the projecting means so that the beam axis is generally perpendicular to the support surface. Motive means move the film and spot relative to one another to expose locations on the film in accordance with a desired plot.

In a further embodiment of the apparatus, the radiant energy source is capable of sensitizing all of the film emulsion layers, and the apparatus further includes a wavelength filter supported in the beam path which allows only desired emulsion layers to be sensitized.

In still a further embodiment of the apparatus, the apparatus has a plurality of radiant energy sources respectively capable of sensitizing different emulsion layers and includes means for bringing the sources separately into registration with the beam so that a plot of at least two colors is produced.

The method of this invention employs the color film of this invention in a plotting operation. One embodiment of the method includes the steps of projecting a beam of radiant energy having wavelengths capable of sensitizing all of the emulsion layers toward the surface of the color film and filtering wavelengths from the beam to allow only the emulsion layers collectively capable of manifesting a particular color upon development to be sensitized. The beam of radiant energy is projected as a spot on the film surface, and the beam and color film are moved relative to one another to sensitize the emulsion layers at different locations according to the desired plot of a particular color image. Further, the wavelength filtering is changed on occasion to alter the sensitizing of the emulsion layers so that upon development the plot of a multi-colored image is manifested.

In an alternative embodiment of the method, different beams of radiant energy, each capable of sensitizing the emulsion layers in different amounts and degrees, are selectively projected toward the surface of the color film. Each beam strikes the surface of the film in the form of a spot, and the spot and color film are moved relative to one another to sensitize the emulsion layers at different locations according to the desired plot of a multi-colored image.

DETAILED DESCRIPTION OF THE PREFERRED EMBODIMENT

Figure 1:
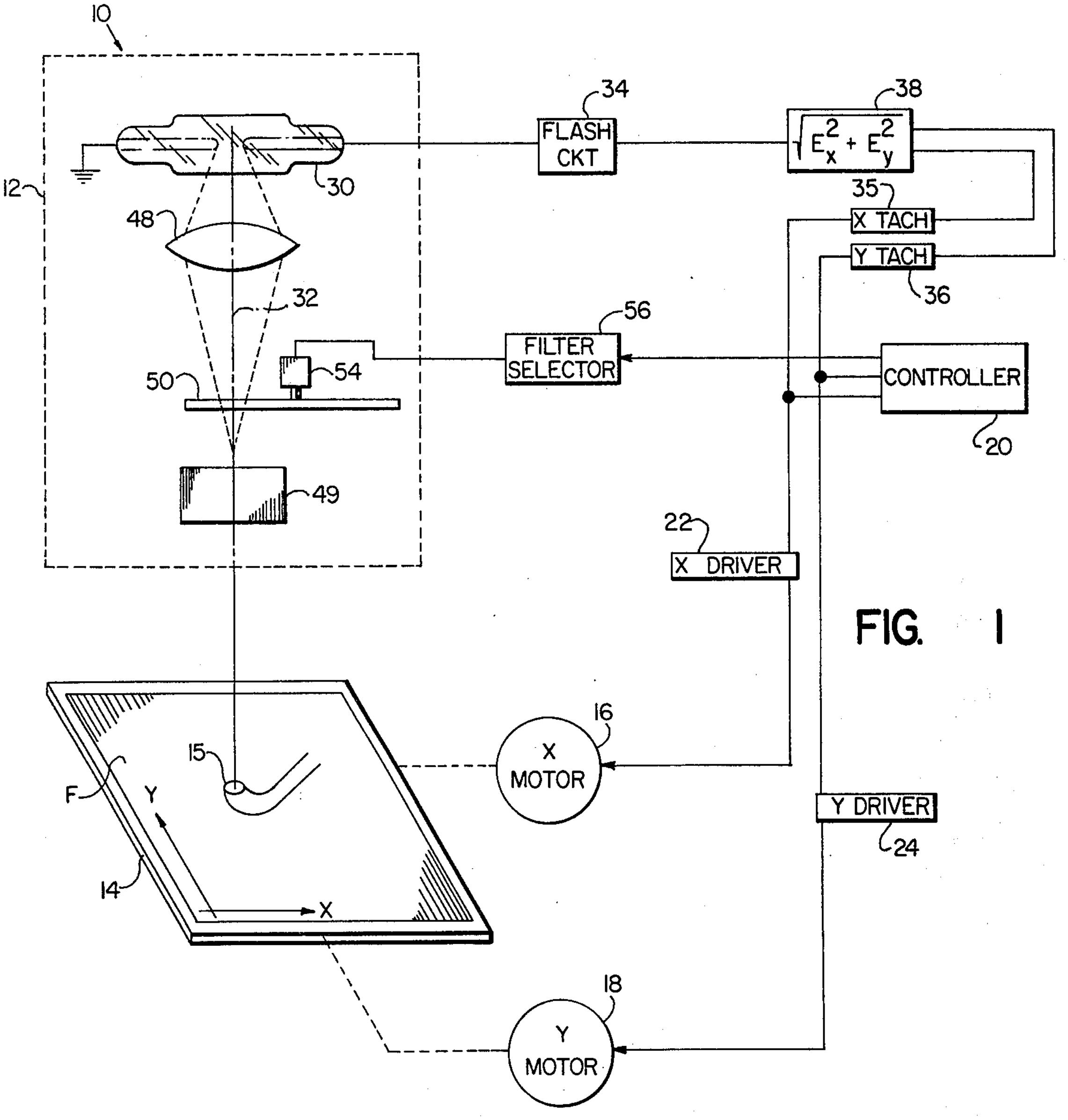
FIG. 1 is a schematic illustration of a photoplotter incorporating the features of the present invention.

FIG. 1 illustrates an automatically controlled photoplotter, generally designated 10, for recording a plot of graphic information by the method of this invention on the film F of this invention. The plotter 10 has a photoexposure or photohead 12 with optical means for generating a beam of sensitizing radiant energy and projecting the beam onto a spot 15 on the film surface. The film F of this invention is fixedly positioned on the flat work surface of a movable table 14 under the photohead 12. The table with the film is movable relative to the photohead 12 in the illustrated X coordinate direction by means of an X-drive motor 16 interposed between the head and the table. Similarly, the table is moved relative to the head in the illustrated Y coordinate direction by means of a Y-drive motor 18. The X- and Y-motions are determined by a plotting program that is stored in the master controller 20 for the plotter. During a plotting operation the controller reads the program and generates either an analog or digital motor command signal which is transmitted to the respective motors 16 and 18 by means of a X-motor driver 22 and a Y-driver 24.

Of course it should be recognized that the relative movement of the photohead and the film F could also be generated by moving the photohead while the film and table 14 are held stationary. Also, the head could be moved in one coordinate direction relative to the table while the table and film are moved in the other coordinate direction. Each of the above described motion generating means results in relative movement of the film F and the spot of radiant energy on the photosensitive surface of the film.

Figure 4:
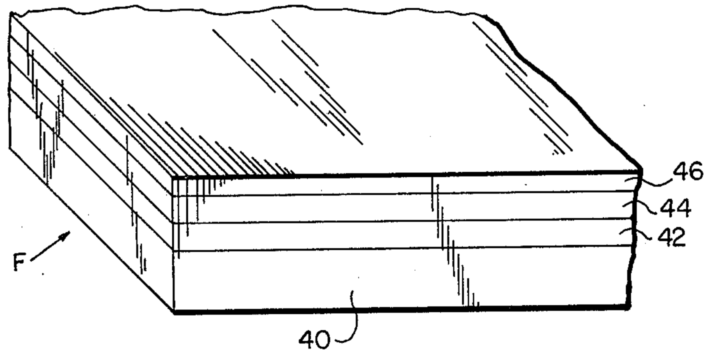
FIG. 4 is an enlarged fragmentary perspective view of the color film in one embodiment of the invention.

In FIG. 4, the film F of this invention is comprised of a sheet material 40 and a plurality of photographic emulsion layers 42, 44, 46 superimposed in overlying relationship on and adhering to the sheet material. The sheet material 40 may be one of a number of materials which provide the film foundation, or base layer, but is preferably composed of a fiber paper. Each of the emulsion layers 42, 44 or 46 is sensitive to exposure only by predetermined wavelengths of non-visible radiant energy, and the predetermined wavelengths to which any one of the emulsion layers is sensitive are different from the predetermined wavelengths to which the other emulsion layers are sensitive. Upon exposure to sensitizing radiant energy, each emulsion layer is developable to manifest a distinguishable color in the visible radiant energy spectrum. In the context of this specification, a color is "distinguishable" if it is distinguishable from the color of non-sensitized areas of the film surface and "different" if it is different from a color manifested by another sensitized and developed emulsion layer.

For example, the upper emulsion 46 of the film F may be sensitive to only one band of the infrared spectrum, the middle emulsion 44 to another band of the infrared spectrum, and the lower emulsion 42 to still another band of the infrared spectrum. In this respect the color film F is similar to conventional color film with three emulsions variously sensitive to selected bands of the visible spectrum, except that the photosensitivity of the film F lies in the non-visible range.

In developing, the film F also differs from conventional film in that dye couplers combine with oxidation products resulting from the reaction of the developer and exposed emulsion in the film and form visible dyes in the regions of the emulsions exposed by the non-visible radiation. Thus the resulting dye colors in the developed film being to a spectrum, i.e. the visible spectrum, different from the spectrum, non-visible, which exposes the emulsions. When the coupled dyes in the three emulsions correspond respectively to the three primary colors, or their complementary colors in the case of a color negative, the developed film displays a color image that may include all of the colors in the visible spectrum.

With such a color film, one can select exposing radiation in the various bands of the non-visible spectrum and expose the film in daylight to produce a color image in the visible spectrum when the film is developed. This process is greatly facilitated in computerized exposure equipment, such as a photoplotter, where the color selections and positioning on the film are machine controlled in accordance with an exposure program.

Since the three subtractive primary colors of magneta, cyan and yellow can be mixed in various amounts to manifest any color in the visible spectrum, there are three emulsions layers in the preferred embodiment of the film F and the distinguishable colors manifested by the sensitized and developed emulsion layers are magneta, cyan and yellow.

It will be understood that the actual production of the color images on the film F may be accomplished by a direct development of the film or by a process which includes printing from the film negative onto a print paper. Here the term "development" is intended to include the production of color images by either a direct development process or a process which includes a printing step.

In the illustrated plotter 10 of FIG. 1, the photohead 12 includes a radiant energy source 30, such as an infrared or ultraviolet lamp, from which a beam of radiant energy is projected. The illustrated source emits a broad band beam which includes multiple wavelengths of non-visible radiant energy to which the emulsion layers are variously sensitive. The radiant energy emanating from the source is directed generally along an optical axis 32 between the source and the work table 14. Emitted from the source in a diffused state, the radiant energy passes through a converging lens 48 and an objective lens 49 as it travels toward the work table. The lenses 48 and 49 collimate and focus the radiant energy into a spot 15 on the film surface.

Figure 2:
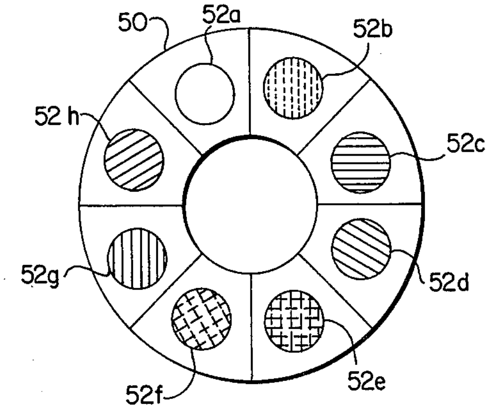
FIG. 2 is a plan view of a wavelength filter disc utilized in the photoplotter of FIG. 1.

To prevent the radiant energy beam from exposing more emulsion layers than would be required for the film F to manifest a desired color, the beam passes through a wavelength filter before striking the film surface. Referring to FIG. 1, a wavelength filter is supported in the beam path by a filter disc 50 mounted adjacent the beam axis 32. The filter disc, shown in greater detail in FIG. 2, includes a plurality of wavelength filters **52*a*–52*h* that are arranged in a circular array near the periphery of the disc. Each filter on the disc 50** when positioned in the beam path filters the broad band beam and allows only selected wavelengths capable of sensitizing selected emulsion layers to strike the film surface. Subsequent development of the film F causes the selectively sensitized emulsion layers to collectively manifest a particular color.

Each of the wavelength filters **52*a*–52*h* possesses wavelength transmission characteristics which are different from another filter of the disc 50. Ideally the different transmission characteristics among the eight filters 52*a*–52*h* of the disc 50** provide means for producing an image in the developed film in eight different colors, and for this reason, the wavelength transmission characteristics of the filters are selected to expose the emulsion layers in the film in eight discriminate combinations. It is desirable to include a position such as 52*a* in the disc with no filter so that all layers are exposed and "black" or "white" images may also be plotted.

As shown in FIG. 1, the disc 50 is mounted on the drive shaft of a small servomotor 54 so that one filter on the periphery of the disc lies within the radiant energy beam. The servomotor 54 rotates the disc about its central axis and positions the respective filters individually in registration with the beam axis 32 to thereby adjust the wavelength composition of the beam striking the film surface. With the filters of different wavelength transmission characteristics and by appropriate actuation of the servomotor 54, a multicolored plot is possible.

The filter selector 56 controls the operation of the servomotor 54 in response to command signals received from the master controller 20. Once the desired filter is in place, command signals are transmitted from the controller to the drive motors 16, 18 to move the film and the projected spot of non-visible radiant energy relative to one another in a plotting operation. Accordingly, the desired color of a particular plotted line is recorded in the controller along with data defining the geometric configuration of the line so that colors may be selected and changed in a completely automatic plotting process. Since the exposure process is cumulative, several passes over the same locations on the film surface may be used with appropriate exposure control to intensify the exposure or mix colors to produce still additional colors.

The illustrated source is periodically excited at various rates by means of a flash circuit 34 for exposure control at different plotting speeds. The flash circuit is controlled by means of the motor command signals that are transmitted to the X- and Y-drive motors 16 and 18 from the controller 20. The same commands are processed respectively by means of an X-tachometer circuit 35 and a Y-tachometer circuit 36 to determine the relative velocity between the film and the spot of radiant energy in each coordinate direction. The output signal Ex and Ey of the circuits 35 and 36 represent the respective velocities and are transmitted to a computing circuit 38 which calculates the total relative velocity in accordance with the Pythagorean theorem. The total velocity signal Ev from the computing circuit 38 is supplied to the flash circuit 34 and is employed to control the rate at which the source 30 is flashed.

By controlling the flashing rate in accordance with the speed of relative movement of the radiant energy spot 15 on the film F, a desired intensity or uniform exposure standard is obtained along the line traced or plotted by the spot. For example, if the relative movement increases a corresponding increase in the flash rate ensues in order to expose the film by the same amount at each point along the plotting line. Of course, increased flashing rates at the same speed will produce greater exposure and decreased flashing rates, decreased exposure. For a more complete description of the flashing circuit and associated controls, reference may be had to U.S. Pat. No. 4,170,745 by Rich and Berdat.

Figure 3:
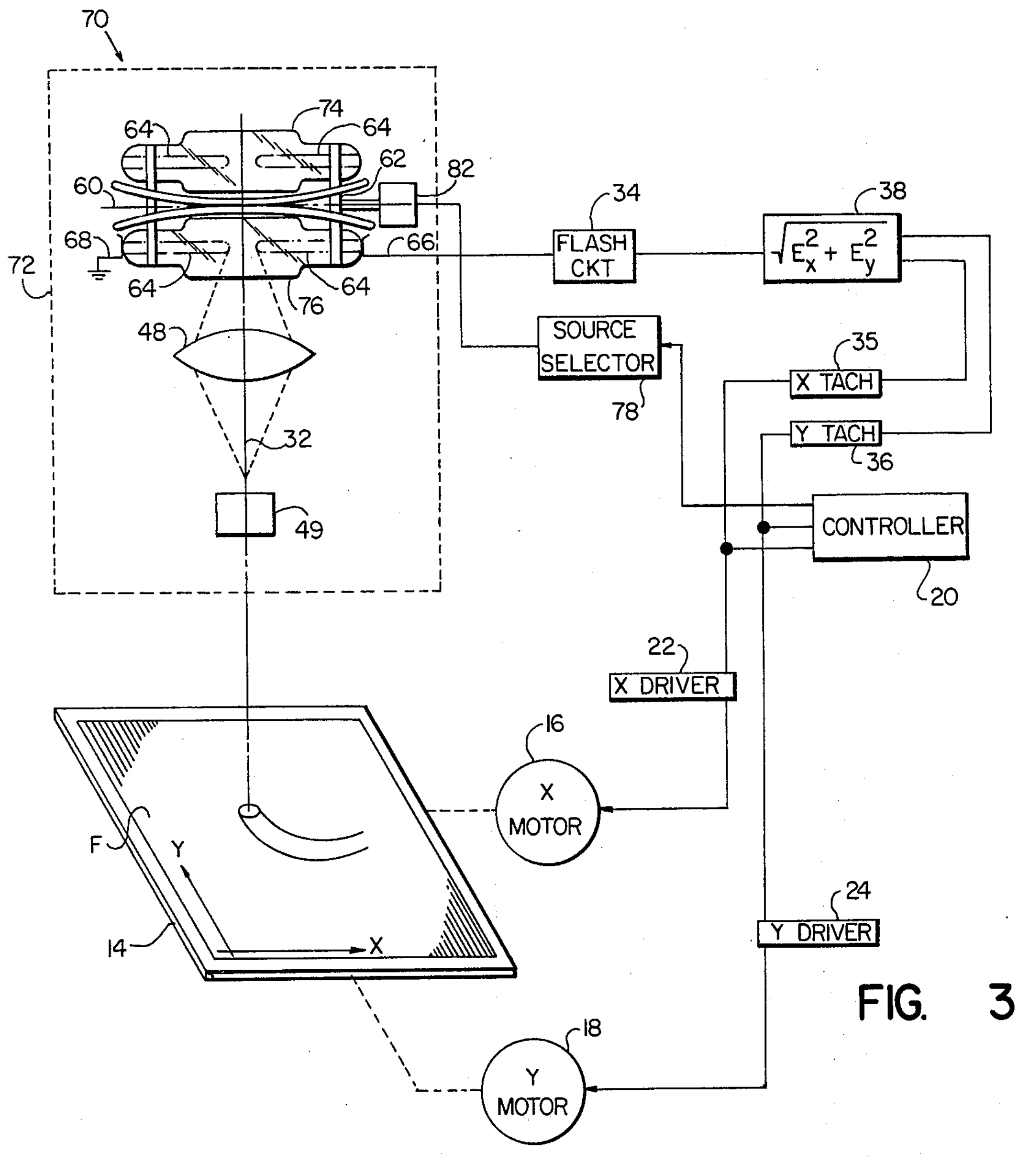
FIG. 3 is a schematic illustration of another photoplotter incorporating the features of the present invention.

In an alternative plotter embodiment, shown in FIG. 3, for carrying out an alternative method of the invention, the wavelength composition of the beam forming the spot on the film surface is changed as beams from different sources of radiant energy are separately brought into registration with the optical axis. Items in the FIG. 3 plotter which correspond to the items of FIG. 1 bear the same reference numerals.

In the plotter 70 of FIG. 3, the photohead 72 has two radiant energy sources 74, 76. Each energy source emits predetermined wavelengths of non-visible radiant energy capable of sensitizing one or more film emulsion layers, and the predetermined wavelengths of one source are different from the predetermined wavelengths of the other source. The two sources are mounted to a fixture 62 for rotation around the fixture's rotation axis 60 and are arranged with reflectors so that when either source is rotated to its lowermost position, as one source 76 is shown to be, the emitted radiant energy is reflected downwardly along the optical axis 32.

The fixture 62 is mounted on the drive shaft of a small servomotor 82. The servomotor 82 rotates the fixture 62 about the axis 60 and positions the respective sources individually in registration with the optical axis 32 to thereby establish the wavelength composition of the beam striking the film surface. One lead 66 and a ground lead 68 of the flash circuit engage the two inner leads 64, 64 of the source brought into registration with the optical axis 32 and thereby connects the source with the flash circuit. Because the sources 74, 76 emit radiant energy of different wavelength composition and may independently be caused to emit radiant energy toward the film surface, a plot of two or more colors can be produced.

The aforementioned descriptions are intended as illustrations of the invention and not as limitations, and it will be understood that many modifications may be made to the apparatus of this invention without departing from the spirit of the invention. For example, the photohead 72 of the FIG. 3 apparatus has been described as having two radiant energy sources but it will be understood that a photohead for changing the beam composition by bringing separate sources in registration with the beam axis is not limited to two sources. Rather, any number of sources, each emitting predetermined wavelengths different from the other sources, may be mounted on the fixture 62 to produce a number of different colors in a plot. Accordingly, the invention may have numerous embodiments falling within the scope of the appended claims.

I claim:

1. An apparatus for recording color images comprising:

a color film including a sheet material and a plurality of emulsion layers in overlying relationship superimposed on and adhering to the sheet material, each emulsion layer sensitive only to exposure by predetermined wavelengths of non-visible radiant energy, the predetermined wavelengths of each emulsion being different from the predetermined wavelengths of the other emulsions, and each emulsion layer being developable to manifest a distinguishable color different from the other emulsion layers upon exposure to sensitizing radiant energy, a support surface on which the color film is spread, a first source of non-visible radiant energy, the radiant energy including wavelengths to which a first of the emulsion layers of the color film is sensitive, and not including wavelengths to which a second emulsion layer is sensitive;

a second source of non-visible radiant energy, the radiant energy of the second source including wavelengths to which the second emulsion layer of the film is sensitive and not including wavelengths to which the first emulsion layer is sensitive, means for bringing the first and second sources separately into registration with a beam axis;

means for projecting the radiant energy emitted from the sources along the beam axis and onto a spot on the film surface, support means for supporting the radiant energy sources and the projecting means so that the beam axis is generally perpendicular to the support surface, and means for moving the film and spot relative to one another to expose locations on the film in accordance with a desired plot.

2. A method for plotting color images comprising the steps of:

providing a color film having a photosensitive surface and a plurality of emulsion layers below the surface, each emulsion layer being sensitive only to predetermined wavelengths of non-visible radiant energy, the predetermined wavelengths of each emulsion being different from the predetermined wavelengths of the other emulsions, and each emulsion manifesting a distinguishable color when sensitized locations of the film are developed, generating a beam of non-visible radiant energy, the non-visible radiant energy within the beam including wavelengths capable of sensitizing at least one of the emulsion layers of the film to manifest a particular color when the film is developed, projecting the beam of non-visible radiant energy onto a spot on the surface of the color film while the film is exposed to daylight, moving the beam of non-visible radiant energy and the color film relative to one another to cause the spot to move to different locations on the film surface to sensitize the emulsion layers at different locations according to the desired plot of a particular color, generating another beam of non-visible radiant energy, the non-visible radiant energy within the beam having wavelengths capable of sensitizing at least another of the emulsion layers to manifest a color different from said particular color upon development, projecting the other beam onto a spot on the surface of the color film while the film is exposed to daylight, and moving the other beam of radiant energy and the color film relative to one another to cause the spot to move to different locations on the film surface to sensitize the other emulsion layer at different locations according to the desired plot of another color.

3. A method for plotting as described in claim 2 wherein the steps of generating one beam and generating another beam comprise generating beams from two different sources of radiant energy.

4. A method for plotting as described in claim 2 wherein the steps of generating one beam and generating another beam comprise generating a broad band beam having multiple wavelengths of non-visible radiant energy from a single source and filtering different wavelengths from the broad band beam to produce the one and the other beams.

5. A method for plotting color images comprising the steps of:

providing a color film having a photosensitive surface and a plurality of emulsion layers below the surface, each emulsion layer being sensitive only to predetermined wavelengths of non-visible radiant energy, the predetermined wavelengths of each emulsion being different from the predetermined wavelengths of the other emulsions, and each emulsion manifesting a distinguishable color different from the other emulsions when sensitized locations of the film are developed, generating a beam of non-visible radiant energy, the non-visible radiant energy within the beam having wavelengths capable of sensitizing all of the emulsion layers, projecting the beam onto a spot on the surface of the color film in visible light without shielding the visible light from the photosensitive surface of the color film;

filtering all but one group of wavelengths corresponding to a particular color from the beam to cause the emulsion layers to be sensitized by the filtered beam and rendered capable of manifesting the particular color upon development, moving the filtered beam of non-visible radiant energy and the color film relative to one another to cause the spot to move to different locations on the film surface and sensitize the emulsion layers at different locations according to the desired plot of a particular colored image, and developing the film to form color dye in the emulsion layers at the sensitized locations and thereby produce a visible plot in color.

6. A method for plotting as described in claim 5 further including the steps of:

subsequently filtering all but another group of wavelengths from the beam to cause the emulsion layers to be sensitized and rendered capable of manifesting a different color upon development, and moving the subsequently filtered beam of non-visible radiant energy and the color film relative to one another to sensitize the emulsion layers according to the desired plot of an image having the different color.

7. A method for plotting color images comprising the steps of:

illuminating a photoplotter and film with radiant energy having wavelengths within the visible spectrum to which the film is insensitive, exposing plural film emulsions by generating beams of radiant energy having wavelengths within plural bands outside the visible spectrum and to which bands the emulsions are respectively sensitive to record color images, and moving the respective beams relative to the film to expose the film emulsions in selected locations with different colors, and developing the sensitized film to produce a colored image in the visible spectrum.

8. An apparatus for recording color images comprising:

a color film including a sheet material and a plurality of emulsion layers in overlying relationship superimposed on and adhering to the sheet material, each emulsion layer sensitive only to exposure by predetermined wavelengths of non-visible radiant energy, the predetermined wavelengths of each emulsion being different from the predetermined wavelengths of the other emulsions, and each emulsion layer being developable to manifest a distinguishable color different from the other emulsion layers upon exposure to sensitizing radiant energy, a support surface on which the color film is spread without shielding from visible radiant energy, a source of non-visible radiant energy, the radiant energy including wavelengths to which a plurality of the emulsion layers of the color film are sensitive, means for projecting the radiant energy emitted from the source along a beam axis and onto a spot on the film surface, support means for supporting the radiant energy source and the projecting means so that the beam axis is generally perpendicular to the support surface, means for moving the film and spot relative to one another to expose locations on the film in accordance with a desired plot; and filtering means supported along the beam axis for selectively filtering from the beam wavelengths other than those to which a particular emulsion is sensitive so that the emulsion layers can be individually sensitized at selected locations by the filtered beam and rendered capable of manifesting a particular color upon development.

* * * * *